June 30, 1931.    G. A. ROGERS    1,811,865
MECHANISM FOR USE IN MUSICAL INSTRUCTION
Filed March 31, 1930

INVENTOR
George Arthur Rogers
BY
Howard P. King
ATTORNEY

Patented June 30, 1931

1,811,865

UNITED STATES PATENT OFFICE

GEORGE ARTHUR ROGERS, OF NEW YORK, N. Y.

MECHANISM FOR USE IN MUSICAL INSTRUCTION

Application filed March 31, 1930. Serial No. 440,397.

The present invention relates to means and method of musical instruction and more particularly to musical instruction in its branch associated with the piano and harmony.

The objects of the invention are to provide a simple device within the means of the usual beginner, and a device which can be not only carried around but is convenient to use in association with the piano, readily adapted for desk use and of size adapted to be put away in a school desk and otherwise convenient for general and special use; to provide a device equally beneficent for class use and for individual use; to enable a student to visualize certain notes and combination of notes to provide a device which will enable the instructor to observe the results of the student's work and point out errors while the errors are still present; to provide a method which will obtain permanent impression on the student of the matter sought to be taught; to secure simplicity of construction and operation and fulfillment of the method; and to obtain other advantages and results as may be brought out in the following description.

Referring to the accompanying drawings in which like numerals of reference indicate similar parts throughout the several views, Figure 1 is a perspective view of my device showing the same in use with the keys thereon arranged to visualize the major D chord in the first octave of the treble clef;

Figure 1:
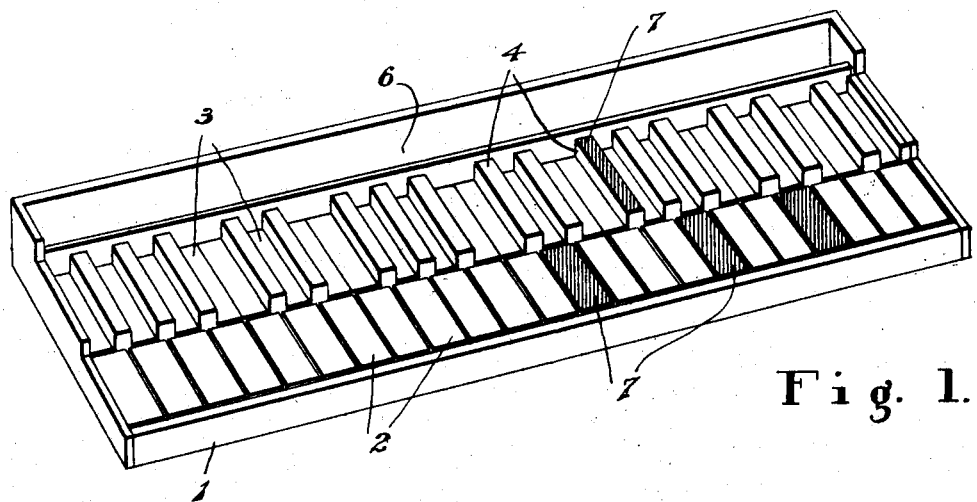
Figure 2:
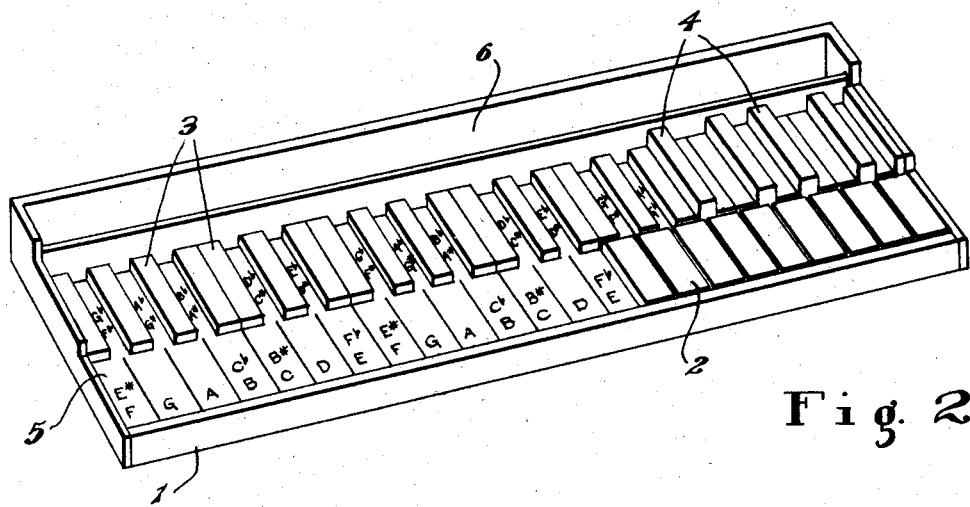
Figure 2 is a similar perspective view showing a portion of the keys removed and disclosing the chart normally hidden by the keys when in position.
Figure 3:
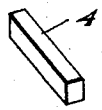
Figure 3 is a perspective view of one of the main removable keys often referred to as the "white" or "ivory" keys.
Figure 4:
Figure 4 is a similar perspective view of one of the removable incidental keys often referred to as the "black" or "ebony" keys of the piano.

In the specific embodiment of the invention illustrated in said drawings, the reference numeral 1 indicates a body or tray member within which are arranged keys simulating the keys as appear upon a piano both in size, shape and position. In the present showing the tray is substantially long enough to contain three octaves, but it is to be understood the invention is not restricted to any particular size, shape or number of octaves. The present showing which includes three octaves has been found in practice to be very convenient and to contain sufficient keys for instruction in the rudiments of music, harmony and piano playing. On an ordinary piano there are ordinarily two varieties of keys, those at the front of the keyboard being arranged in a common plane and referred to as the white or ivory keys. Toward the back of the keyboard between certain of the ivory keys are several keys known as the black or ebony keys which also have their upper faces in a common plane but rise above the plane of the front or ivory keys. My invention contemplates utilization of a similar arrangement of keys. However, the keys of a piano are depressible, whereas the keys of my invention are not depressible, but are individually removable from the tray. By virtue of this fact, any particular notes, combination of notes or chords can be indicated on the keyboard by the pupil by proper placement of keys in the keyboard or tray.

As shown, I prefer to construct the white keys in two parts. The front parts of these white keys, which I will term for convenience main keys 2, are preferably all of a similar shape and size extending from the front edge of the keyboard back to the line of the raised or black keys. Those portions of the white keys which lie between the black keys are preferably separate from the front portions and are fixed to the tray so as not to be removable. Consequently, when the removable keys are all taken out of the tray there still remain rear portions 3 of the white keys properly spaced to again receive black or upstanding keys 4 in the usual relationship appearing in a piano. Since the front portions or main keys 2 are all of the same size and shape, they will rest in proper relationship upon being inserted in the front trough portion 5 of the tray.

In use, it is preferable to have all of the keys in proper position in the tray while the student is utilizing the device so that he will have a replica of a piano keyboard before him at all times. The instructor may orally give the student an exercise in picking out certain notes, or the student may perform an exercise from a written or printed sheet or book. For convenience in holding such an exercise sheet or book, the tray provides a rear music holder or trough 6.

In order that the instructor may know what keys have been indicated by the pupil and also enable the pupil to visualize the results acquired, I preferably make the underside of the removable keys in contrast, as at 7, to the normal upper side of the keys. As one instance for obtaining such contrast, I utilize keys of usual color on the upper sides, namely, white for the main keys and black for the upstanding keys, and then make the underside of all of the removable keys red. Of course, the color red is arbitrary and any other color or means may be substituted for obtaining the contrast. The device is so constructed that the student can turn any of the removable keys upside down and replace them in the same place from which they were taken. Consequently, when the instructor advises the student to illustrate the major chord of D, the student will then remove the keys representing the notes of that chord and replace them upsidedown as indicated in Figure 1. The keys will remain in position to both show the instructor exactly what the student has done and will enable the student to visualize the chord by virtue of the contrasting character of the keys turned over and therefore impresses the results of his work upon his mind. After that exercise is completed it takes but a moment to turn the inverted keys back and another exercise can be performed.

If so desired, the bottom of the tray may contain a chart indicating the names of the keys or notes which the keys represent, normally hidden by the keys themselves. As a result, every time the student turns over a particular key, the name of the note is brought to his attention and thus enables the notes to be learned by the student's constant association therewith. The invention is obviously adaptable to instruction to learn to play the piano and also to instruction in harmony and music in general. The manufacture of the device utilizing a plurality of keys of minimum numbers and shapes lends to economy and simplicity, and brings the device within the means of the usual beginner in music, to schools in general and to class work as well as home study. The invention has the advantage that the keys turned over by the student remain until the instructor has opportunity to see what the student has done and to point out the errors if any exist. This is important because with the ordinary piano, the student is inclined to lift his fingers when either the sound or the instructor's attitude indicates the error, and the instructor then is often at a loss to show the student the exact error committed. The keys on the piano are all alike when the fingers are removed, whereas in the present invention the contrast remains until positive action is taken to turn the keys over again. Furthermore, the student is given actual hand work to perform rather than a mere metal concept, and the mental impression is strengthened by the hand work with the contrast maintained before his eyes for a definite period.

Obviously detail changes may be made in the construction and use of my improved device and in the steps of the utilization thereof for performing the method of instruction, and I do not wish to be understood as limiting myself to the exact construction shown except as set forth in the following claims when construed in the light of the prior art.

Having thus described the invention, I claim:—

1. A device of the character described comprising a keyboard simulating a musical instrument keyboard, and a series of removable keys of corresponding size and shape so as to be interchangeable and reversible whereby certain selected keys may be removed and reversed to contrast with remaining keys on the keyboard.

2. A device of the character described comprising a keyboard simulating a musical instrument keyboard, and two series of removable keys, the keys of each series being of corresponding size and shape to all other keys of the same series so as to be interchangeable and reversible, whereby selected keys of either series may be removed and reversed to contrast with remaining keys in the series.

3. A device of the character described comprising a tray having a rim, and a plurality of removable keys of rectangular and regular shape filling the said tray from the rim at one end thereof to the rim at the other end thereof, said keys being removable and reversible and retained in either normal or reversed position by said rim.

4. A device of the character described comprising a keyboard simulating a musical instrument keyboard, removable keys, said keys each having the underside thereof contrasting with the upper sides of said keys and each key being individually removable and adapted to be inverted so as to expose the contrasted underside thereof at the upper side of the key when replaced in inverted position.

GEORGE ARTHUR ROGERS.